United States Patent [19]

Mart et al.

[11] 4,280,201

[45] Jul. 21, 1981

[54] VARIABLE GAP ROLL ALONG SWITCHING

[75] Inventors: Carl F. Mart; Douglas B. Waits, both of El Paso, Tex.

[73] Assignee: The Anaconda Company, Greenwich, Conn.

[21] Appl. No.: 55,554

[22] Filed: Jul. 9, 1979

[51] Int. Cl.³ .............................................. G01V 1/22
[52] U.S. Cl. ....................................... 367/56; 367/59; 367/63; 367/78; 370/113; 307/154
[58] Field of Search ....................... 367/56, 58, 59, 63, 367/78, 79; 370/80, 112, 113; 328/104, 137; 154

[56] References Cited

U.S. PATENT DOCUMENTS 3,240,286  3/1966  Musgrave ............................. 367/63

Primary Examiner—Howard A. Birmiel
Attorney, Agent, or Firm—Hubbard, Thurman, Turner, Tucker & Glaser

[57] ABSTRACT

A seismic prospecting roll along switching system using a relatively small number of switches to provide roll along prospecting while also providing variable gapping with minimum loss of active channels. In a simple form two sets of switches are provided with each set having one switch provided for each geophone input and with switch outputs connected in pairs, appropriately selected, to the inputs of signal processing channels. The two sets of switches are connected to the processing channels in a skewed or staggered manner with the amount of skew corresponding to a selectable gap. A controller is provided for electronically closing the appropriate switches from each set in accordance with the desired gap. Additional switch sets may be employed to provide additional selectable gaps while maintaining complete utilization of processing channels.

6 Claims, 4 Drawing Figures

VARIABLE GAP ROLL ALONG SWITCHING

BACKGROUND OF THE INVENTION

This invention relates to seismic roll along switching equipment and in particular to an improved switching system having a greatly reduced number of signal switches arranged to provide selectable gapping with maximum utilization of processing channels.

The roll along method of seismic geophysical prospecting is well known and commonly employed. In this method a large number of geophone groups and shot points are laid out along a prospecting traverse. During any given initiation, or shot, only part of the geophones are used to record reflections from that initiation. Thus for example, while one hundred and twenty geophone groups may be laid out along the traverse, only sixty may be active for a particular shot. A gap is usually provided about the shot point by leaving a number of groups immediately adjacent the shot point inactive. The active groups are usually spaced symmetrically about the gap. The active groups are those which are connected for a particular shot to a signal processing and recording channel. System capacity is usually defined by the number of signal processing channels which comprise filters and amplifiers matched to very high precision and account for the greatest portion of the systems cost.

Rather complicated roll along switches using either mechanical relays or sliding switches having thousands of switch contacts are commonly used for connecting appropriate geophone groups to processing channels. Commercially available switches using sliding contacts include a rotary version sold under the trademark "Rot-A-Long" by Inputs/Outputs Devices, Inc., of Houston, Tex. and a linear version sold under part number S100-002131 by GUS Manufacturing, Inc., of El Paso, Tex. Such switches are limited in several ways by the fact that they are basically mechanical devices. The thousands of switch contacts are prone to contact failure especially under the field conditions encountered in geophysical prospecting. The devices also tend to be inflexible in terms of the allowable gapping choices since the large number of switches must be arranged to provide at least one common set of roll along positions and it is difficult to modify that set to any great extent. While solenoid and ratchet arrangements can be used to remotely move the mechanical type switches through their various positions, any failure of the mechanism to operate typically causes erroneous selection of groups throughout the rest of the operation. As a result of these problems, roll along matrices have essentially always been housed in the main recording equipment near an operator who can visually check for proper operation.

One reason for the complexity of known roll along matrices is the usual requirement that processing channel outputs be in a particular order corresponding to the order of active channels. That is, if the geophone groups are numbered from one end of the traverse to the other, it is usually required that the lowest numbered active geophone group be connected to the first processing channel and the highest numbered group be connected to the last processing channel. The outputs of the processing channels are usually coupled by a multiplexer to a single analog to digital converter in a sequence beginning with the first processing channel and ending with the last. The multiplexer sequentially couples each channel to the A to D converter during each sampling period and the output of the converter is coupled to a recording system which therefore records the digitized samples always in an order beginning with the lowest numbered active group. Due to this ordering requirement, each of the processing channel inputs must be moved to a new group for each new shot. While such switching matrices are quite complicated and subject to contact failure, they do guarantee that at each shot point, each of the processing channels is utilized.

Many of the problems of the known roll along switching matrices are solved by the simplified roll along switching arrangement disclosed in application, Ser. No. 055,632 filed by Kamal A. Mahmood, concurrently herewith. In a simple form Mahmood's system provides one switch for each geophone input with one contact of each switch connected to one of the inputs and the other contact of each switch connected in sequentially repeating order to inputs of signal processing channels. As a result, the number of switches is reduced to the number of geophone groups and is only a small fraction of the number of switch contacts conventionally employed. Mahmood's system further provides a modified multiplexer addressing scheme for coupling signals to an analog to digital converter and recording system in the desired sequence even when the switches do not actually connect geophone groups to processing channels in that sequence. Any desired gap may be employed in Mahmood's system but for every inactive group, one of the signal processing channels is also inactive for the particular shot. For most general work, a selectable gap of from zero to fifteen groups is preferred. In the system taught by Mahmood, an additional fifteen processing channels must be provided if the full recording capacity of the system is to be employed for every shot and gap selection from zero to fifteen groups is also to be provided. As noted above, the signal processing channels are the single most expensive part of the system and the fifteen additional groups would significantly increase the price of most systems.

Thus, it can be seen that a reduction in the number of switches involved in roll along matrix as compared to the prior art mechanical devices is desirable and any substantial reduction in number would greatly enhance the accurancy and reliability of geophysical prospecting systems. It is also desirable that a roll along switching system provide a selectable gap while maintaining maximum utilization of processing channels. In addition, it is desirable that the switches employed in such roll along matrices be electronically switchable to avoid mechanical failures and increase flexibility of operation.

SUMMARY OF THE INVENTION

Accordingly an object of the present invention is to provide an improved geophysical prospecting system having a minimum number of low signal level switches.

Another object of the present invention is to provide an electronically controllable roll along switch for geophysical prospecting systems.

Yet another object of the present invention is to provide a roll along switching system providing selectable gap and maximum utilization of signal processing channels.

An improved roll along seismic prospecting system according to the present invention, includes two or more sets of switches with one switch in each set having one contact connected to each of the geophone inputs provided in the system and second contacts connected in sequentially repeating groups equal in number to the number of signal processing channels. The connection of the switch second contacts of the first set of switches to signal processing channels is skewed with respect to the connection of second contacts of switches in the second set by a preselected amount corresponding to a desired selectable gap. Additional sets of switches may be provided with connections also skewed with respect to the first two sets to provide additional gap selections. In addition a number of signal processing channels in excess of the number of recording channels in the system may be provided to provide further gap selections. Also included in the systems is means for reordering active channel outputs for proper sequential serial recording.

BRIEF DESCRIPTION OF THE DRAWINGS

The present invention may be better understood by reading the following detailed descriptions of the preferred embodiments with reference to the accompanying drawings wherein.

DESCRIPTION OF THE PREFERRED EMBODIMENT

Figure 1:
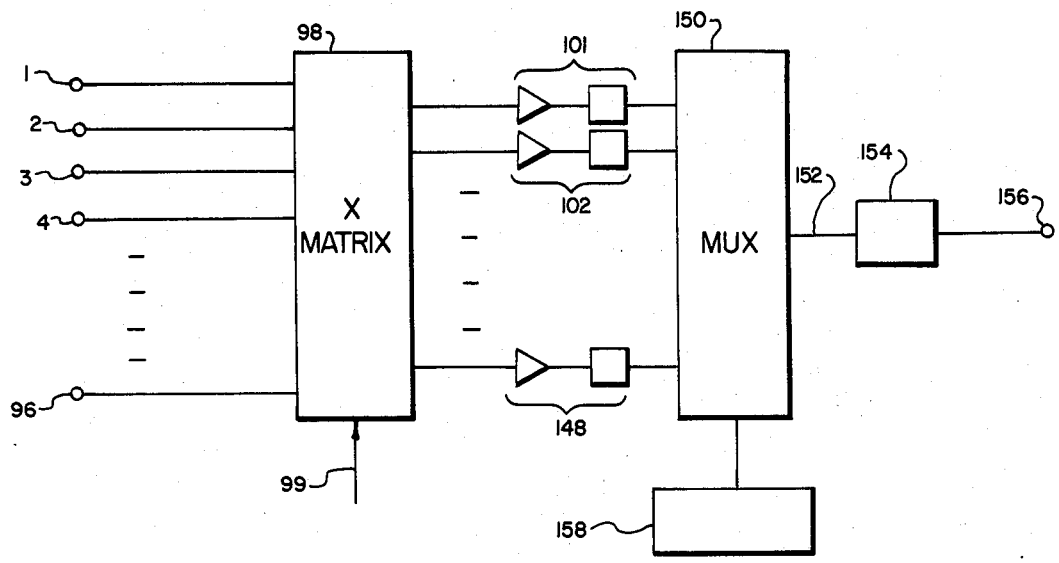
FIG. 1 is a block diagram of a portion of a roll along geophysical prospecting system according to the prior art.

With reference now to FIG. 1, there are illustrated portions of a geophysical prospecting system according to the prior art illustrating the complexity of such systems. Such a system will have a large number, for example 96 inputs numbered 1 through 96 for connection to geophones arranged in a linear spread along a geophysical prospecting traverse. In such a system processing channels numbered 101 through 148 may be provided for processing geophone outputs received on half of the inputs 1 through 96. A matrix switch 98, usually mechanical, is provided for connecting the appropriate forty-eight of the inputs to the forty-eight processing channels in response to a control signal received on an input line 99. It is generally required that the forty-eight inputs to be used for a particular shot be connected sequentially to the forty-eight processing channels. That is, if geophones 4 through 51 are to be used for a particular shot, then input 4 should be connected to processing channel 101 and input 51 should be connected to processing channel 148 with the remaining inputs connected in sequence in between. It is well known that the switching matrices 98 capable of providing the necessary switching include thousands of mechanical contacts and are therefore prone to failure. The outputs of processing channels 101 through 148 are connected to inputs of a multiplexer 150 which provides one signal at a time on an output line 152 coupled to an analog to digital converter 154 which in turn provides a digitized version of the signal on output 156. Output 156 is typically coupled to a recording system having a number of channels corresponding to the processing channels, in this case forty-eight. An address counter 158 of some form is generally provided for sequentially addressing multiplexer 150 during each sampling period to couple the outputs of processing channels 101 through 148 to output 152 in sequence.

Figure 2:
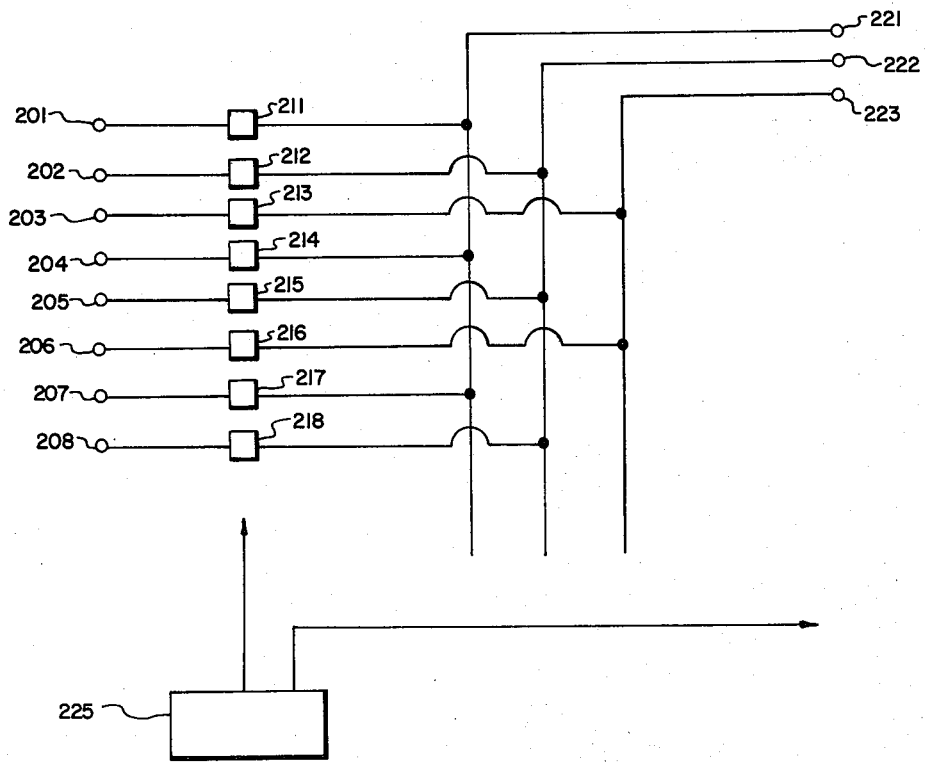
FIG. 2 is an illustration of a prior art switching matrix which is simplified with respect to the FIG. 1 form.
Figure 3:
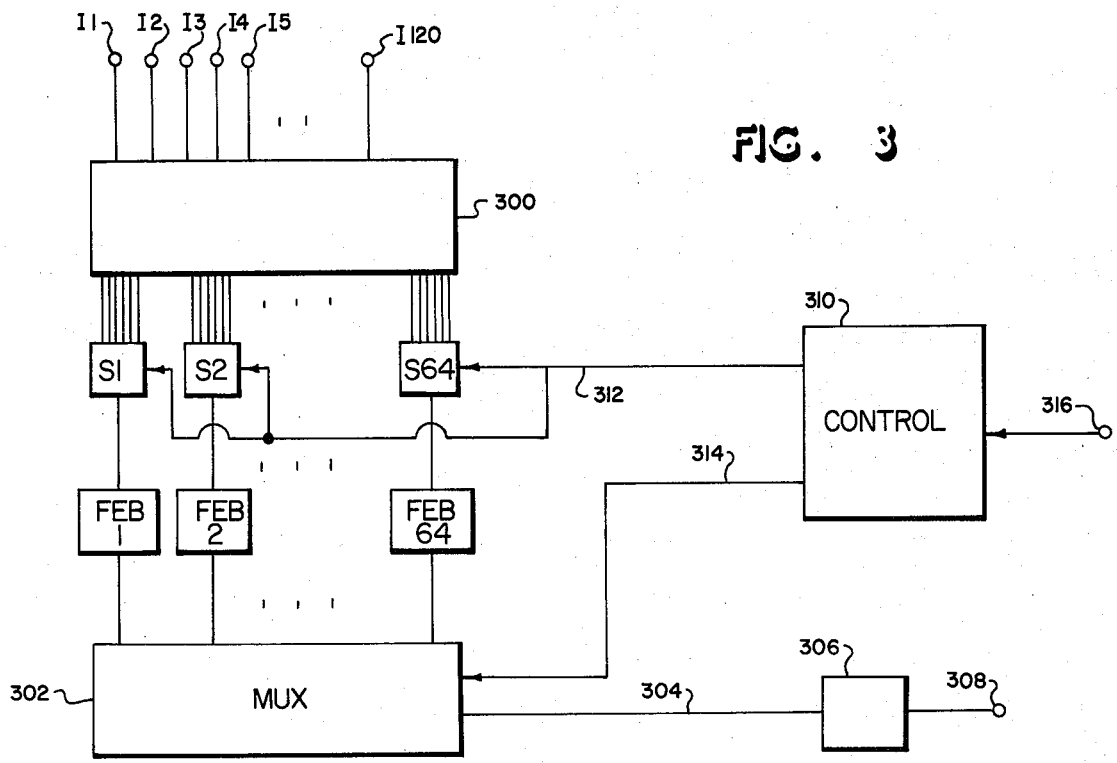
FIG. 3 is a block diagram of a geophysical propsecting roll along system according to the present invention.

With reference now to FIG. 2, a simplified illustration of a switching network as taught in the above referenced co-pending application of Kamal A. Mahmood is provided. The network arrangement shown in FIG. 3 is intended as a direct replacement for the switching matrix 98 of FIG. 1. In this simplified version, eight inputs numbered 201 through 208 are shown connected to simple single-pole, single-throw switches numbered 211 through 218. It will be understood that in most cases switches 211 through 218 would actually be double-pole, single-throw switches connected to switch a return line for each signal line due to low signal levels normally received from geophones. Second contacts of each of the switches 211 through 218 are connected in a repeated sequence to three output lines numbered 221 through 223. That is, the first sequence comprises switches 211 through 213 connected to the output lines 221 through 223 respectively. The sequence repeats by connecting the second contacts of switches 214 through 216 to output lines 221 through 223 respectively. This sequence is repeated until all of the inputs and switches are connected to one of the output lines 221 through 223.

A control unit 225 is provided in this system for closing a subset of up to three switches out of any set of three consecutive switches. Control 225 also provides an output signal to other control circuitry for addressing the multiplexer, such as multiplexer 150, in appropriate order. The switching arrangement illustrated in FIG. 2 provides roll along switching with a vastly reduced number of switches when compared to the prior art arrangements illustrated in FIG. 1. But the FIG. 2 arrangement also causes a loss of processing channels during each shot which corresponds to a selected gap size. That is, if in a simplified version of FIG. 2, the gap is to be one inactive group then there can be only one active group on each side of the gap. Since three processing channels would be provided for receiving signals from each of the output lines 221 through 223 only two would be utilized during each shot.

A typical system such as that shown in FIG. 1 would have forty-eight processing channels and at least twice that number of geophones in the spread. Gap selection from zero to fifteen groups has been found to satisfy the needs of most users of geophysical prospecting equipment. If the FIG. 2 arrangement is expanded to forty-eight processing channels and a gap of fifteen is selected, approximately one third of the processing channels would be inactive during each shot. Since the processing channels are the single most expensive part of the system, it would be quite inefficient to provide half again as many processing channels as are utilized during each shot. In addition, most recording systems are designed to record a fixed number of channels of information, usually corresponding to the number of processing channels. In this example, there would be one unused recording channel for each unused processing channel, further compounding the inefficiency.

With reference now to FIG. 3, there is illustrated in block diagram form one embodiment of the present invention which provides an efficient arrangement for variable gap selection while also providing a tremendous reduction in switch matrix complexity similar to that illustrated in FIG. 2. The system of FIG. 3 is designed to receive signals from 120 geophones on a prospecting traverse and has inputs numbered I-1 through I-120 for connection to these geophones. In this preferred embodiment a preamplifier 300 is provided for each of the inputs I-1 through I-120. If desired, the preamplifiers 300 may be included as part of the geophones themselves or may be separate as illustrated in FIG. 3. The preamplified signals are coupled in groups of six to a set of switches designated S-1 through S-64. Each of the switches S-1 through S-64 may be seen as six single-pole single-throw switches having one contact connected to each of the six input lines and second contacts connected together to a single output line. It will be appreciated that by use of preamplifiers 300 it is not absolutely necessary to provide switching of a ground return path for each of the inputs since the signal level has been substantially increased. The single output from each of the switches S-1 through S-64 is connected to the input of a corresponding processing channel each designated FEB-1 through FEB-64. The term FEB stands for Front End Board and comprises a typical analog processing channel having various filters and amplifiers. These processing channels are quite closely matched and tuned to specific characteristics and account for the majority of the cost of the system. As with the prior art systems, a multiplexer 302 receives the outputs of processing channels FEB-1 through FEB-64 and couples one at a time to an output line 304 coupled to the input of analog to digital converter 306. The output of A to D converter 306 is coupled to an output line 308 which may be coupled to a typical recording system for permanent recording of the information. In the preferred embodiment, output 308 is connected to a sixty-channel recording system which, as will be explained below, is always fully utilized. A control unit 310 provides outputs on lines 312 and 314 for controlling switches S-1 through S-64 and multiplexer 302 respectively. Controller 310 receives inputs on line 316 either from an operator or a computerized controller of the system.

Figure 4:
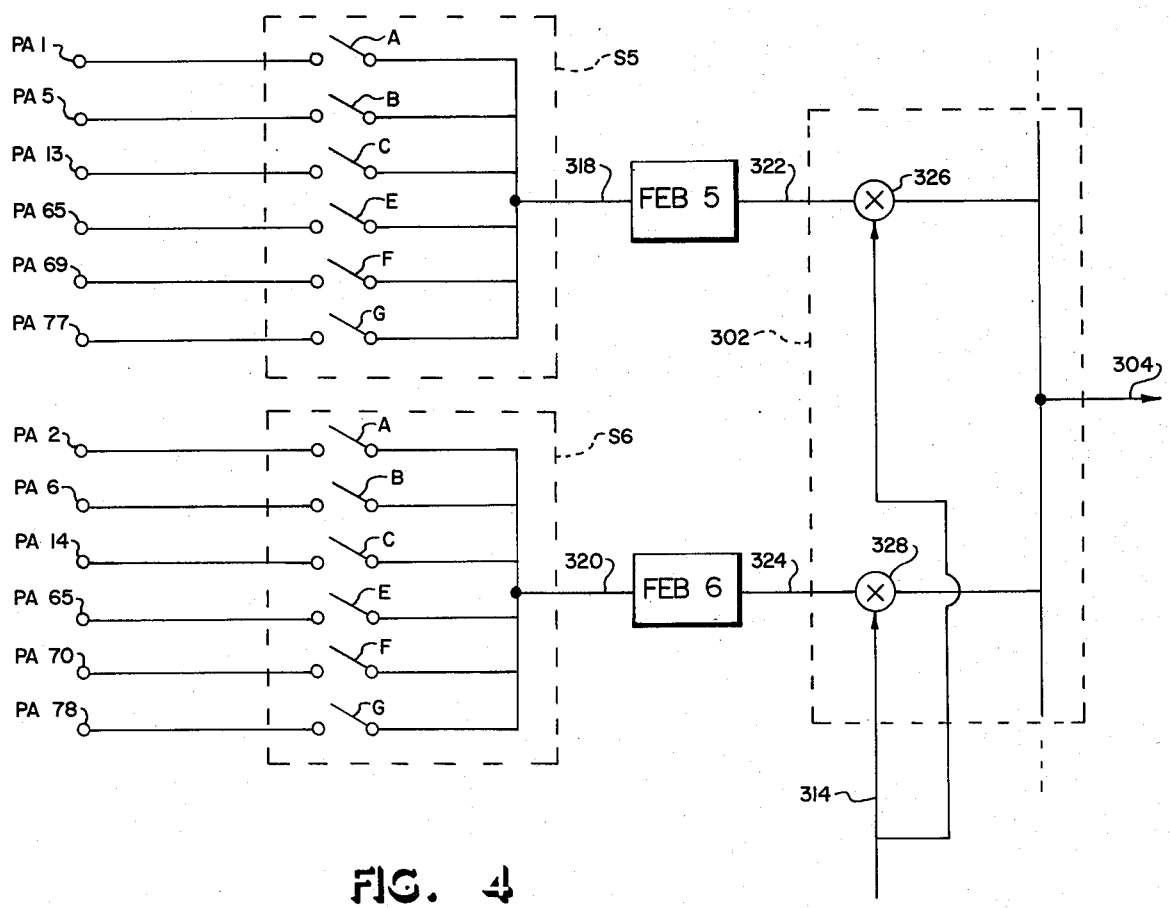
FIG. 4 is a more detailed block diagram of portions of the FIG. 3 embodiment.

Further details of the switches S-1 through S-64 of FIG. 3 and their connections to the rest of the system are provided in FIG. 4. In FIG. 4, the details of switches S-5 and S-6 are shown in the appropriately designated dashed line boxes. Switch S-5 has six inputs labeled PA1, PA5, PA13, PA65, PA69 and PA77. PA1 indicates the ouput of the preamplifier connected to input I-1 of FIG. 3 and so on. The inputs of switch S-6 are likewise designated according to the appropriate preamplifiers. Each switch S-5 and S-6 comprises six normally open single-pole single-throw switches designated A, B, C, E, F, G. Second contacts of each of the six switches are connected together to output lines 318 and 320 connected to inputs of processing channels FEB-5 and FEB-6 respectively. The processing channels FEB-5 and FEB-6 have outputs 322 and 324 connected respectively to inputs of multiplexer 302. In FIG. 4 a portion of multiplexer 302 is indicated as a pair of electronically controllable switches 326 and 328 which are controlled by the signals on input line 314. One contact of each of the switches 326 and 328 is connected together to the output line 304.

While each of the switches S-1 through S-64 could comprise a set of manually controllable switches, electronically controllable switches are preferred. A latching reed relay sold under the part number 720-R-12 by the Teledyne Corporation is believed to be suitable. If it is desired to totally eliminate moving parts, a solid state switching device, such as the FET switch sold under the part number DG 509 by Siliconix Corporation, may be used. With any small signal switching device, it is desirable to also provide high voltage suppression circuitry on the inputs I-1 through I-120, especially if preamplifiers 300 are not employed or are located at the geophones. In any case, use of electronically switchable devices allows the control unit 310 to directly activate the appropriate switches.

The particular arrangement of the preamplifier 300 connections to the remaining switches S-1 through S-64 may be determined by reference Table 1. In Table 1 the first column indicates the input or preamplifier number. The remaining three columns provide an indication of the appropriate switches and contacts to which the particular signal input or preamplifier output is to be connected. Thus the output of preamplifier 1 is connected to contact A of switch S-5 and contact B of switch S-1. In nearly all cases in the preferred embodiment each input is connected to at least three different switches. Thus for example, the output of preamplifier 10 is connected to contact A of switch S-14, contact B of switch S-10, and contact C of switch S-2. Table 1 is simplified by omitting portions between inputs 10 and 60 and inputs 74 and 115, but it is apparent that all the information omitted continues in sequence from that which is included. A close study of Table 1 indicates the particular order in which the switches and contacts were selected. Thus, looking at the line corresponding to input 10, it is seen that the switch number in column 1 is four greater than the number in column 2 and is twelve greater than that in column 3. This difference continues throughout the entire table. In addition, in column 1 the first sixty inputs are connected to switch contact A while the rest are connected to contact E which is the first contact in the second half of each of switches S-1 through S-64. In similar fashion in the second column each of the inputs 1 through 64 is connected to contact B while the remaining inputs are connected to contact F which is the second contact in the second set of three. A similar order is likewise found in column 3 where all inputs are shown connected to switches C or G.

TABLE 1

| INPUT/PA# | SWITCH/CONTACT CONNECTIONS | | |
|---|---|---|---|
| 1 | S5A | S1B | |
| 2 | S6A | S2B | |
| 3 | S7A | S3B | |
| 4 | S8A | S4B | |
| 5 | S9A | S5B | |
| 6 | S10A | S6B | |
| 7 | S11A | S7B | |
| 8 | S12A | S8B | |
| 9 | S13A | S9B | S1C |
| 10 | S14A | S10B | S2C |
| . | . | . | . |
| 60 | S64A | S60B | S52C |
| 61 | S1E | S61B | S53C |
| 62 | S2E | S62B | S54C |
| 63 | S3E | S63B | S55C |
| 64 | S4E | S64B | S56C |
| 65 | S5E | S1F | S57C |
| 66 | S6E | S2F | S58C |
| 67 | S7E | S3F | S59C |
| 68 | S8E | S4F | S60C |
| 69 | S9E | S5F | S61C |
| 70 | S10E | S6F | S62C |
| 71 | S11E | S7F | S63C |
| 72 | S12E | S8F | S64C |
| 73 | S13E | S9F | S1G |
| 74 | S14E | S10F | S2G |

TABLE 1-continued

| INPUT/PA# | SWITCH/CONTACT CONNECTIONS | | |
|---|---|---|---|
| . | . | . | . |
| . | . | . | . |
| . | . | . | . |
| 115 | S55E | S51F | S43G |
| 116 | S56E | S52F | S44G |
| 117 | S57E | S53F | S45G |
| 118 | S58E | S54F | S46G |
| 119 | S59E | S55F | S47G |
| 120 | S60E | S56F | S48G |

The roll along switching matrix as illustrated by FIGS. 3 and 4 and by Table 1 may be used in a number of ways. For example if a continuous sequence of sixty groups are to be active out of the first sixty-four with no gap, it would be appropriate to close contact B on all sixty-four switches. Controller 310 would then simply address multiplexer 302 with the sixty sequential addresses corresponding to the sixty desired active channels which are to be coupled to the sixty channel recording system. It can be seen that since sixty-four processing channels are provided in the preferred embodiment any sixty-four sequential switches in columns 2, 3 or 4 of Table 1 may be closed without having two inputs connected simultaneously to a single processing channel. In this sense the connections called for in each of the columns 2, 3 and 4 of Table 1 correspond to the system illustrated in FIG. 2. That is, the inputs are connected in a sequentially repeating order with a length of sixty-four. Since only sixty channels are recorded at a time, there are four extra channels and therefore a gap of up to four could be selected without further loss of processing channels.

The above mentioned staggering of the switch connections in columns 2, 3 and 4 of Table 1 provide additional gapping capabilities of four, eight and twelve inactive stations. Thus for example, if it is desired to have stations 31 through 60 active, gap station 61 through 64 and have stations 65 through 94 active this may be done by appropriate selection of switch contacts rather than actually having inactive processing channels at the gap location. For this described roll along arrangement contact A of switches S-35 through S-64 would be closed and contacts F of switches S-1 through S-30 would be closed. Since in the repeating sequential order switch S-1 follows switch S-64 there is actually no loss of stations at the point of the gap. Gaps of eight and twelve may likewise be selected anywhere in the string of 120 geophones without actually having inactive processing channels at the location of the gap.

Careful study of FIGS. 3 and 4 and Table 1 will show that gaps of zero, four, eight and twelve may be provided with only sixty processing channels rather than sixty-four as provided in the preferred embodiment. In the preferred embodiment, an additional three processing channels are provided so that every possible gap between zero and fifteen is available to the user. That is, the three staggered sequential orders of switch connections illustrated in Table 1 provide the four, eight and twelve gap choices while the additional three processing channels allow one, two or three channels to be skipped at the actual gap location to fill in all of the other possible gap selections. The one additional processing channel, that is FEB-64, is provided to simplify the system in terms of digital numbers. That is, sixty-four is the exact number of counts available from a six bit counter so that the addressing of multiplexer 302 is greatly simplified when exactly sixty-four inputs are provided.

While as noted above, the described switching network may be employed in a number of ways to achieve variable gap roll along operations, Table 2 provides one convenient set of switch selections which provides for every possible gap from zero to fifteen located anywhere in the spread of 120 geophones. The first column of Table 2 lists the sixteen possible gap sizes from zero to fifteen. The second column lists the switch contacts which should be selected before the gap for the particular gap selected. For example, if a gap of four is desired switch contacts A or E should be closed for all active groups before the gap. A study of Table 1 shows that no input or preamplifier channel is connected to both an A and E contact. In similar manner if a gap of 10 is selected, contacts B or F are closed for all active groups prior to the gap. In similar fashion column three provides a list of the switch contacts which should be closed for all active groups after a particular gap. Again each choice shows an alternative such as B or F and C or G since the alternative choices are never found connected to the same input. The fourth and final column of Table 2 indicates the number of lost porcessing channels occurring at the actual gap location. Thus, as discussed above, gaps of zero, four, eight and twelve may be selected without having inactive processing channels at the gap location. It is for this reason that selectable gaps of four, eight and twelve could be provided in the described system with a total of only sixty processing channels. The additional selectable gap sizes such as one, two and three require the loss of additional processing channels at the gap location as indicated in Table 2, column 4.

TABLE 2

| GAP SIZE | BEFORE GAP FEB SELECT | AFTER GAP FEB SELECT | LOST FEBS |
|---|---|---|---|
| 0 | A/E | A/E | 0 |
| 1 | A/E | A/E | 1 |
| 2 | A/E | A/E | 2 |
| 3 | A/E | A/E | 3 |
| 4 | A/E | B/F | 0 |
| 5 | A/E | B/F | 1 |
| 6 | A/E | B/F | 2 |
| 7 | A/E | B/F | 3 |
| 8 | B/F | C/G | 0 |
| 9 | B/F | C/G | 1 |
| 10 | B/F | C/G | 2 |
| 11 | B/F | C/G | 3 |
| 12 | A/E | C/G | 0 |
| 13 | A/E | C/G | 1 |
| 14 | A/E | C/G | 2 |
| 15 | A/E | C/G | 3 |

The preferred form of operation of the present system can be seen with reference to FIGS. 3 and 4 and Tables 1 and 2. Controller 310 may include memory capacity sufficient to store the information contained in tables 1 and 2. Software may also be included to provide choice of appropriate switch closings in response to information received on input line 316. Thus for example, for a particular roll along shot, signals may be received on input 316 indicating that ground stations 11 through 25 are to be active, stations 26 through 21 are to be gapped and stations 32 through 76 are to be active. From this command, controller 310 would determine that a gap of six has been called for and would consult Table 2 to determine the appropriate switch contacts which are be be closed. From Table 2 controller 310 would determine that contacts A or E are to be closed for ground stations 11 through 25 which occur before the gap. Reference to Table 1 information would indicate that preamplifiers 11 through 25 are connected to the A contacts of switches S-15 through S-29 and contacts A of these switches would be closed. In similar manner the Table 2 information indicates that ground stations after the gap should be connected by means of contacts B or F. Reference to Table 1 would indicate that ground stations 32 through 64 are connected to contacts B of switches S-32 through S-64 and these contacts would be closed. Such reference would also indicate that inputs 65 through 76 are connected to contacts F of switches 1 through 12 and these contacts would also be closed. Once the controller has effected these switch closings, the system would be ready for a shot, usually at the center of the gap.

During each sample period of each shot, controller 310 addresses multiplexer 302 by line 314 in a sequence corresponding to the order in which preamplifier outputs are connected to the processing channels. Thus during each sample interval, the multiplexer 302 is addressed in a sequence causing it to read out signals on line 304 in an order corresponding to, for the above example, FEB-15 through FEB-29, FEB-32 through FEB-64 and finally FEB-1 through FEB-12. As a result the signals provided on output line 304 and ultimately line 308 would correspond to the sixty active channels in exactly the same sequence as they are physically located along the geophysical traverse.

After all samples are recorded for a particular shot, controller 310 must prepare the system for the next shot. In most roll along prospecting, the shot position moves by one or two geophone positions at a time. The active group positions and gap therefore normally move only one or two positions for each shot also. As a result, the latching relay, or other form of latching switch, has a particular advantage in the present invention. In moving from one shot position to the next, most switches remain in the condition set for the previous shot. For example, if the shot is moved by a single group spacing and a gap is used, only two switches need to be closed and two switches need to be opened. Thus, it is not necessary for controller 310 to activate sixty switches for each shot.

In view of the above description of the apparatus of the present invention and its method of use, various modifications will be apparent to those skilled in the art. For example, additional sets of switch contacts may be added to switches S-1 through S-64 to provide additional selectable gaps without providing additional processing channels. Likewise the particular staggering between sets of switch contacts is a matter of choice although the binary type staggering of four and eight or three and six is preferred. Other modifications and changes can be made within the scope of the present invention as defined by the appended claims.

We claim:

1. In a roll along geophysical prospecting system of the type having "m" geophone inputs, a smaller number "n" signal processing channels and a switching network for coupling "n" of said "m" geophone inputs to said "n" processing channels, an improved switching network comprising;
at least first and second sets of "m" switches, with one switch in each set having a first contact connected to said "m" geophone inputs respectively and with the switches of said first set having second contacts connected to said processing channels in a first repeated sequential order and the switches of the second set having second contacts—connected to said processing channels in a second repeated sequential order, where said first and second repeated sequential orders are offset relative to each other by an amount equal to a preselected selectable gap size.

2. Improved switching means according to claim 1 further including control means for closing a subset of "n" switches taken from said first set in response to a selection of no gap and taken from both said first and second sets in response to a selection of said preselected gap.

3. Improved switching means according to claim 1 further including a third set of "m" switches having first contacts connected to said "m" geophone inputs respectively, and having second contacts connected to said processing channels in a third repeated sequential order offset from said first repeated sequential order by an amount equal to a second preselected gap size.

4. An improved geophysical prospecting system according to claim 1 further including: a multiplexer having "n" inputs, each connected to an output of said "n" processing channels and a single output;
a recording system having an input coupled to said multiplexer output for recording a number "n-i" of channel outputs; and,
control means for selecting a subset of "n-i" of said "n" multiplexer inputs to be coupled to said multiplexer output whereby a selectable gap of up to "i" stations may be provided in addition to said offset between said first and second repeated sequential orders.

5. In a roll along geophysical prospecting system of the type having "m" geophone inputs, a smaller number "n" signal processing channels and a switching network for coupling "n" of said "m" geophone inputs to said "n" processing channels an improved switching network comprising:
multiple-input single-output switches "1" through "n" each having an output connected to processing channels "1" through "n" respectively, wherein said multiple inputs include a first set of inputs for connection to n geophone inputs, a second set for connection to a different set of "n" inputs, and so on, and each set of inputs includes at least first and second inputs connected to geophone inputs separated by a preselected selectable gap.

6. In seismic roll along prospecting, a method for coupling preselected sets of signals from "m" geophone inputs to a smaller set of "n" processing channels and providing a selectable gap without use of excess processing channels comprising:
connecting geophone inputs "1" through "m" to first contacts of a first set of "m" switches and to first contacts of a second set of "m" switches,
connecting second contacts of said first set of "m" switches to inputs of processing channels "1" through "n" in a first repeated sequential order,
connecting second contacts of said second set of "m" switches to inputs of processing channels "1" through "n" in a second repeated sequential order offset from said first repeated sequential order by a preselected selectable gap size, and
selectively closing "n" switches selected partially from said first set and partially from said second set to provide a gap of inactive geophone inputs while utilizing all "n" processing channels.

* * * * *

UNITED STATES PATENT AND TRADEMARK OFFICE
CERTIFICATE OF CORRECTION

PATENT NO. : 4,280,201
DATED : July 21, 1981
INVENTOR(S) : Carl F. Mart and Douglas B. Waits It is certified that error appears in the above-identified patent and that said Letters Patent are hereby corrected as shown below:

Col. 5, line 45, "ouput" should be --output--; see page 8, line 24 of the original specification Col. 8, line 24, "porcessing" should be --processing--; see page 13, line 21 of the original specification Col. 10, line 44, after "n", insert --geophone--; see page 19 (Claim 5), line 8 of the original claims Signed and Sealed this Sixth Day of October 1981

[SEAL]

Attest:

Attesting Officer

GERALD J. MOSSINGHOFF

Commissioner of Patents and Trademarks